United States Patent
Zou et al.

(10) Patent No.: US 10,116,249 B2
(45) Date of Patent: Oct. 30, 2018

(54) REDUCED RIPPLE INVERTER FOR HYBRID DRIVE SYSTEMS

(71) Applicant: Ford Global Technologies, LLC, Dearborn, MI (US)

(72) Inventors: Ke Zou, Canton, MI (US); Chingchi Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/435,667

(22) Filed: Feb. 17, 2017

(65) Prior Publication Data
US 2018/0241337 A1 Aug. 23, 2018

(51) Int. Cl.
| | |
|---|---|
| *H02P 25/098* | (2016.01) |
| *H02P 29/024* | (2016.01) |
| *B60L 11/18* | (2006.01) |
| *H02P 27/08* | (2006.01) |
| *H02P 9/10* | (2006.01) |
| *B60L 15/08* | (2006.01) |

(52) U.S. Cl.
CPC ........ *H02P 29/026* (2013.01); *B60L 11/1803* (2013.01); *B60L 15/08* (2013.01); *H02P 9/10* (2013.01); *H02P 27/08* (2013.01); *B60L 2210/14* (2013.01); *B60L 2210/40* (2013.01); *B60L 2240/529* (2013.01); *B60Y 2200/92* (2013.01); *Y10S 903/906* (2013.01)

(58) Field of Classification Search
USPC .................... 318/139, 448, 611, 623, 629
See application file for complete search history.

(56) References Cited

U.S. PATENT DOCUMENTS

| | | | | | |
|---|---|---|---|---|---|
| 4,588,933 | A | * | 5/1986 | Sun ........................... | H02P 6/34 318/400.21 |
| 5,568,023 | A | * | 10/1996 | Grayer ..................... | B60K 6/30 180/165 |
| 5,852,558 | A | * | 12/1998 | Julian ..................... | H02M 1/12 363/132 |
| 6,711,037 | B2 | * | 3/2004 | Odachi ................... | H02M 7/48 363/132 |
| 7,606,052 | B2 | * | 10/2009 | Akagi ..................... | H02M 1/12 363/40 |
| 8,810,060 | B2 | | 8/2014 | Kamaga | |
| 2002/0141216 | A1 | * | 10/2002 | Ishihara .................. | B60L 1/003 363/132 |
| 2006/0197480 | A1 | * | 9/2006 | Mori ........................ | H02P 6/16 318/400.04 |
| 2009/0134700 | A1 | * | 5/2009 | Tanaka ................... | B62D 5/046 307/10.6 |
| 2011/0050136 | A1 | * | 3/2011 | Sumi ....................... | B60L 3/04 318/400.3 |
| 2014/0306663 | A1 | | 10/2014 | Ngo et al. | |
| 2014/0354195 | A1 | | 12/2014 | Li et al. | |
| 2016/0268916 | A1 | | 9/2016 | Ramsay et al. | |
| 2016/0288660 | A1 | | 10/2016 | Yang et al. | |

* cited by examiner

*Primary Examiner* — Bentsu Ro
(74) *Attorney, Agent, or Firm* — David B Kelley; Brooks Kushman P.C.

(57) ABSTRACT

A powertrain for a vehicle includes a wye wound electric machine and a controller. The electric machine is coupled with an inverter. The controller is configured to, in response to an electrical connection between the vehicle and an AC grid, couple a capacitor between a neutral terminal of the electric machine and a negative terminal of the inverter to absorb reactive power from the AC grid.

17 Claims, 7 Drawing Sheets

REDUCED RIPPLE INVERTER FOR HYBRID DRIVE SYSTEMS

TECHNICAL FIELD

This application is generally related to an electric machine and inverter system configured to reduce a current ripple during charging of the electric vehicle from an AC grid.

BACKGROUND

Electrified vehicles including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range and provide a maximum current. The traction battery is alternatively referred to as a high-voltage battery. However, improved performance of electric machines may be achieved by operating in a different voltage range, typically at voltages greater than the traction battery terminal voltage. Likewise, the current requirements to drive a vehicular electric machine are commonly referred to as high current.

Also, many electrified vehicles include a DC-DC converter, also referred to as a variable voltage converter (VVC), to convert the voltage of the traction battery to an operational voltage level of the electric machine. The electric machine, that may include a traction motor and a generator, may require high voltage and high current. Due to the voltage and current requirements, a battery module and a power electronics module are typically in continuous communication.

SUMMARY

A powertrain for a vehicle includes a wye wound electric machine and a controller. The electric machine is coupled with an inverter. The controller is configured to, in response to an electrical connection between the vehicle and an AC grid, couple a capacitor between a neutral terminal of the electric machine and a negative terminal of the inverter to absorb reactive power from the AC grid.

A method of controlling a powertrain includes, in response to an electrical connection between an AC grid and an electric vehicle containing the powertrain, modulating switches of an inverter according to reactive power from the AC grid to induce a field in a wye wound electric machine of the powertrain to absorb a portion of the reactive power.

A powertrain for a vehicle includes a wye wound electric machine and a controller. The electric machine is coupled with an inverter. The controller is configured to, in response to an electrical connection between the vehicle and an AC grid, modulate switches of the inverter to flow a current in the electric machine to absorb reactive power from the AC grid in at least one winding of the electric machine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A single phase alternate current (AC) charger for electric vehicles typically passes an AC ripple at various frequencies. Typically, the most noticeable frequency component is the component at twice the grid or line frequency, and the grid input power has a pulsing shape with a dc offset (Pin_dc), a large AC component at twice the line frequency and a peak to peak value of 2(Pin_dc). This power ripple causes a current ripple at twice the grid frequency on the battery side such that extra circuitry may be required to protect the battery. Also, there are current ripples at other frequencies, such as different orders of harmonics due to grid distortion and the switching frequency of a charger's semiconductor switches. To filter these ripples, a large dc-link capacitor is required in the charger. This bulk capacitor increases the cost, volume and weight of the charger.

As the electric vehicle is not in motion during AC grid charging, its electrical drive system (e.g., powertrain or E-drive system), which includes a traction drive inverter and an electric machine, is typically disconnected from the battery. Here, an apparatus and method is presented that utilizes the E-drive system and operates it as a low frequency current compensator during charging. A powertrain is disclosed that includes a capacitor that is selectively coupled between a neutral terminal of a wye wound electric machine and a negative terminal of the motor inverter. In another embodiment, the controller for the powertrain is configured to modulate switches of the inverter during AC grid charging, at a frequency greater than the line frequency, to flow a current through one phase winding of the electric machine such that the current returns via a different phase winding of the electric machine.

Figure 1:
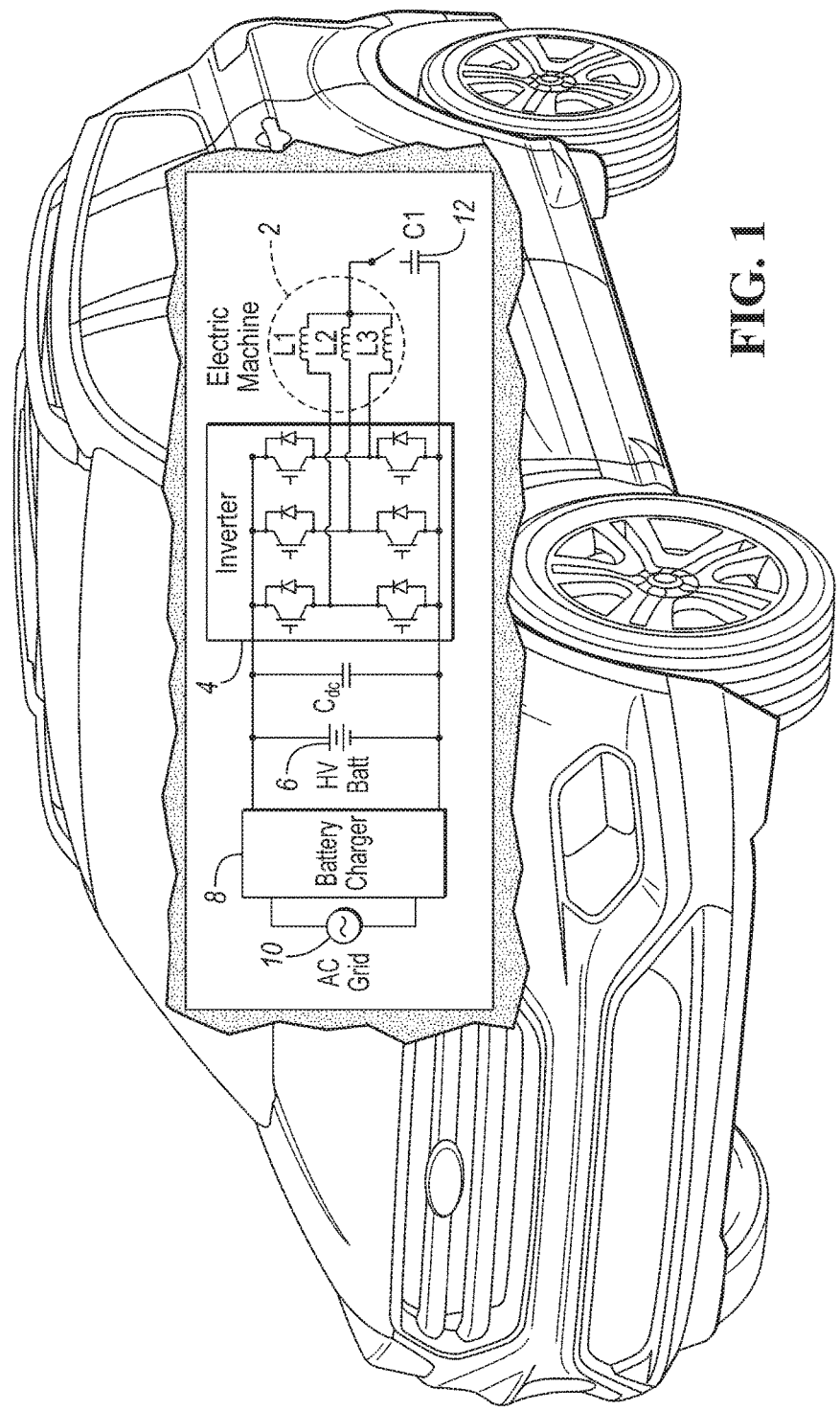
FIG. 1 is a diagram of an electrified vehicle with an electric machine and inverter system configured to reduce a current ripple during charging of the electric vehicle from an AC grid.

FIG. 1 depicts a hybrid electric vehicle illustrating internal electric powertrain components configured to flow a current through windings of an electric machine 2 by operating the electric machine inverter 4 while charging a high voltage traction battery 6 via a battery charger 8 that is coupled with an AC grid 10. In one embodiment, a controller (e.g., the electric machine inverter controller) may selectively engage or couple a capacitor 12 between a neutral terminal of the electric machine and a negative terminal of the electric machine inverter. Also, the controller may modulate the switches of the electric machine inverter at a frequency greater than the line frequency to reduce a ripple current based on the line frequency and harmonics of the line frequency. Here, a controller (e.g., the electric machine inverter controller) may selectively modulate switches of the inverter 4 to absorb reactive energy from the AC grid 10. The modulation of the switches of the inverter 4 may be done to absorb the reactive energy in the capacitor 12 and/or in the inductive windings of the electric machine 2.

Figure 2:
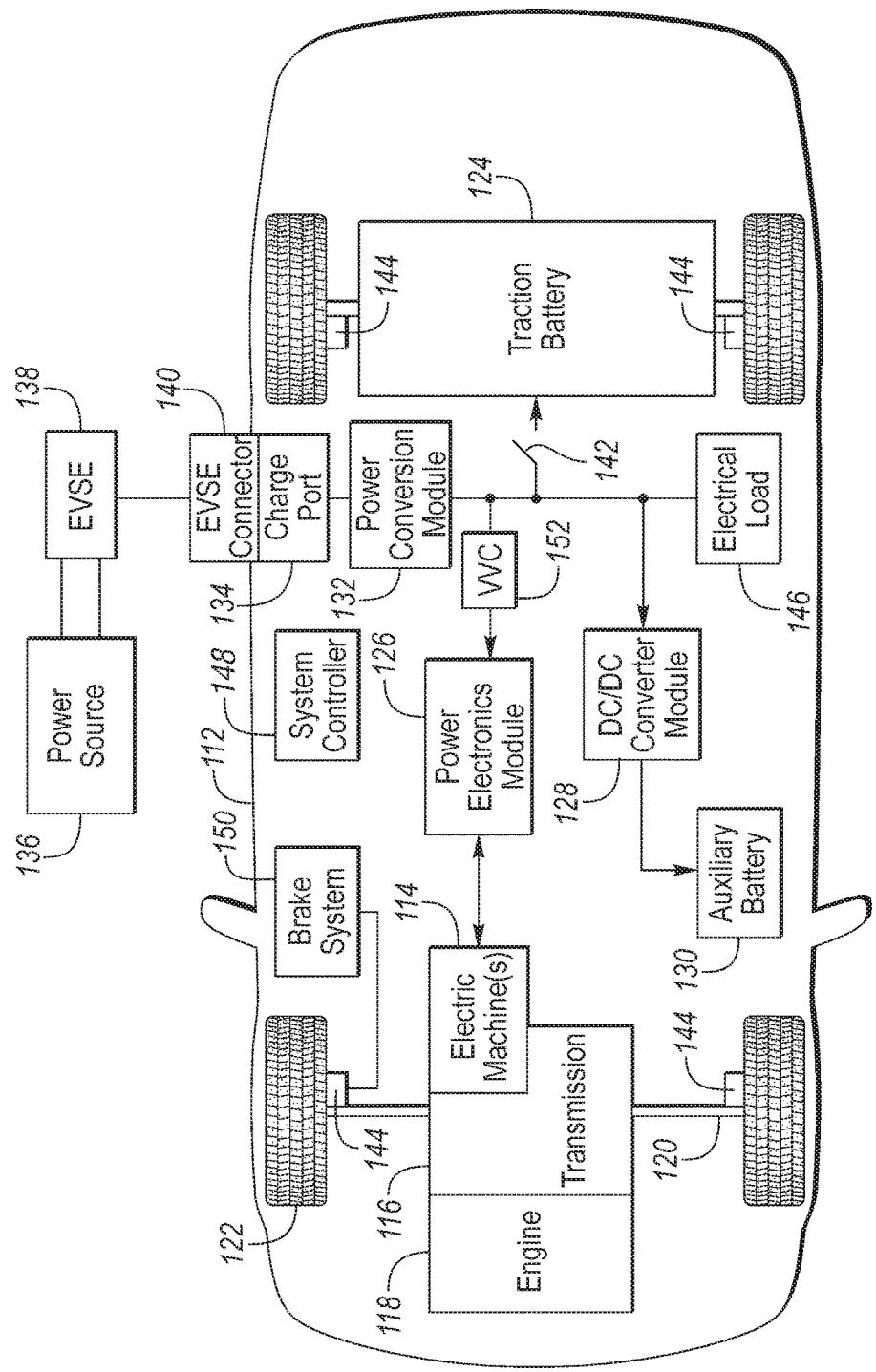
FIG. 2 is a diagram of a hybrid vehicle illustrating typical drivetrain and energy storage components including AC grid charging components.

FIG. 2 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high-voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied.

The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Often the VVC 152 is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller that monitors and controls electrical parameters (e.g., voltage and current) at various locations within the VVC 152. In some configurations, the VVC controller may be included as part of the VVC 152. The VVC controller may determine an output voltage reference, $V_{dc}^*$. The VVC controller may determine, based on the electrical parameters and the voltage reference, $V_{dc}^*$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller may command the VVC 152 to provide the desired output voltage using the control signal. The particular control signal at which the VVC 152 is operated may be directly related to the amount of voltage boost to be provided by the VVC 152.

With reference to FIG. 2, the VVC 152 may boost or "step up" the voltage potential of the electrical power provided by the traction battery 124. The traction battery 124 may provide high-voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor 202 may be electrically coupled in parallel to the traction battery 124. The input capacitor 202 may stabilize the bus voltage and reduce any voltage and current ripple. The VVC 152 may receive the HV DC power and boost or "step up" the voltage potential of the input voltage according to the duty cycle. Often an output capacitor is electrically coupled between the output terminals of the VVC 152 and the input of the power electronics module 126 to stabilize the bus voltage and reduce voltage and current ripple at the output of the VVC 152.

Figure 3:
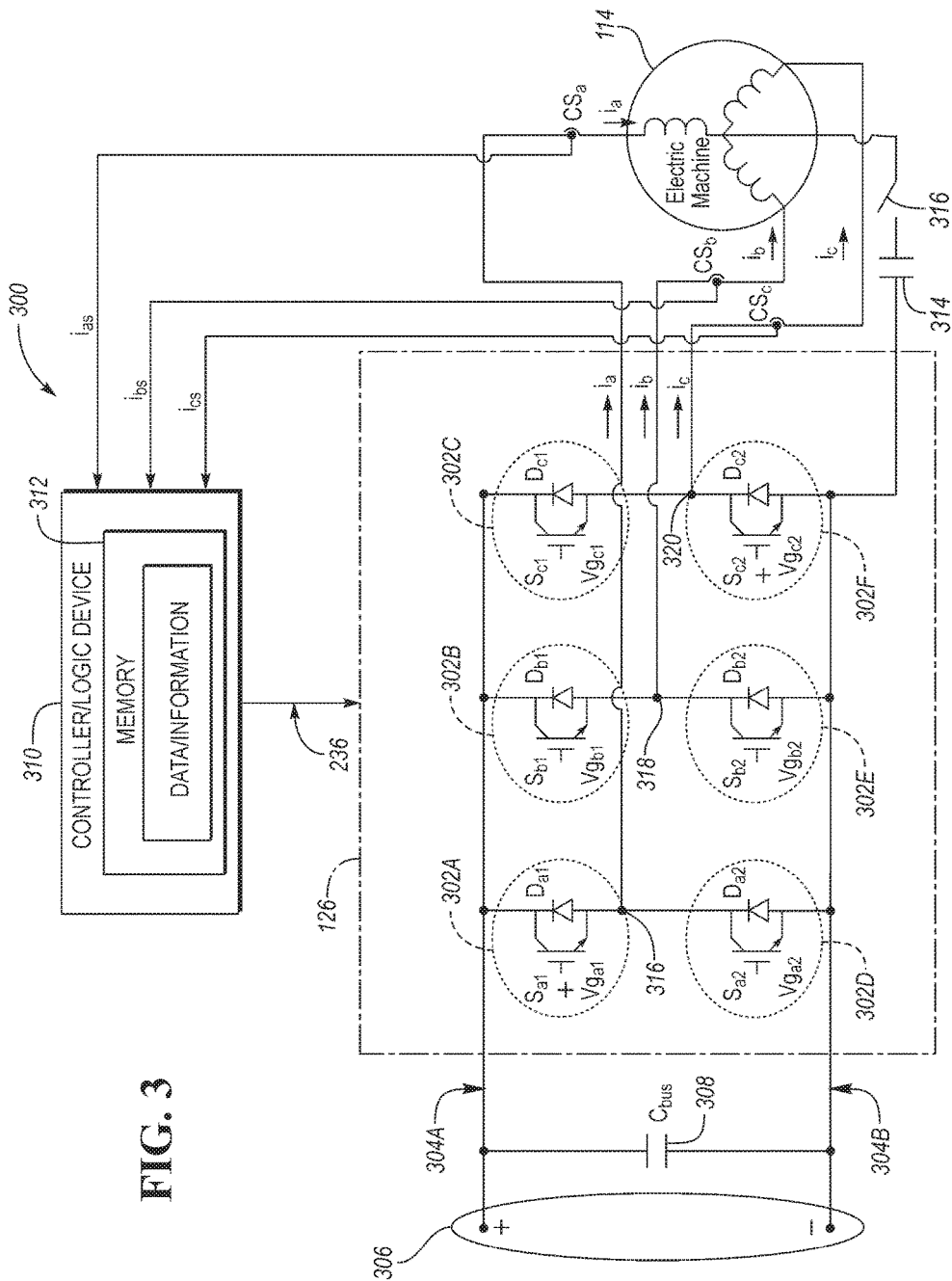
FIG. 3 is a schematic diagram of a power inverter of a power electronics module.

With reference to FIG. 3, a system 300 is provided for controlling a power electronics module (PEM) 126. The PEM 126 of FIG. 3 is shown to include a plurality of switches 302 (e.g., IGBTs) configured to collectively operate as an inverter with first, second, and third phase legs 316, 318, 320. While the inverter is shown as a three-phase converter, the inverter may include additional phase legs. For example, the inverter may be a four-phase converter, a five-phase converter, a six-phase converter, etc. In addition, the PEM 126 may include multiple converters with each inverter in the PEM 126 including three or more phase legs. For example, the system 300 may control two or more inverters in the PEM 126. The PEM 126 may further include a DC to DC converter having high power switches (e.g., IGBTs) to convert a power electronics module input voltage to a power electronics module output voltage via boost, buck or a combination thereof.

As shown in FIG. 3, the inverter may be a DC-to-AC converter. In operation, the DC-to-AC converter receives DC power from a DC power link 306 through a DC bus 304 and converts the DC power to AC power. The AC power is transmitted via the phase currents ia, ib, and ic to drive an AC machine also referred to as an electric machine 114, such as a three-phase permanent-magnet synchronous motor (PMSM) as depicted in FIG. 3. In such an example, the DC power link 306 may include a DC storage battery to provide DC power to the DC bus 304. In another example, the inverter may operate as an AC-to-DC converter that converts AC power from the AC machine 114 (e.g., generator) to DC power, which the DC bus 304 can provide to the DC power link 306. Furthermore, the system 300 may control the PEM 126 in other power electronic topologies.

With continuing reference to FIG. 3, each of the phase legs 316, 318, 320 in the inverter includes power switches 302, which may be implemented by various types of controllable switches. In one embodiment, each power switch 302 may include a diode and a transistor, (e.g., an IGBT). The diodes of FIG. 3 are labeled $D_{a1}$, $D_{a2}$, $D_{b1}$, $D_{b2}$, $D_{c1}$, and $D_{c2}$ while the IGBTs of FIG. 3 are respectively labeled $S_{a1}$, $S_{a2}$, $S_{b1}$, $S_{b2}$, $S_{c1}$, and $S_{c2}$. The power switches $S_{a1}$, $S_{a2}$, $D_{a1}$, and $D_{a2}$ are part of phase leg A of the three-phase converter, which is labeled as the first phase leg A 316 in FIG. 3. Similarly, the power switches $S_{b1}$, $S_{b2}$, $D_{b1}$, and $D_{b2}$ are part of phase leg B 318 and the power switches $S_{c1}$, $S_{c2}$, $D_{c1}$, and $D_{c2}$ are part of phase leg C 320 of the three-phase converter. The inverter may include any number of the power switches 302 or circuit elements depending on the particular configuration of the inverter. The diodes ($D_{xx}$) are connected in parallel with the IGBTs ($S_{xx}$) however, as the polarities are reversed for proper operation, this configuration is often referred to as being connected anti-parallel. A diode in this anti-parallel configuration is also called a freewheeling diode.

As illustrated in FIG. 3, current sensors $CS_a$, $CS_b$, and $CS_c$ are provided to sense current flow in the respective phase legs 316, 318, 320. FIG. 3 shows the current sensors $CS_a$, $CS_b$, and $CS_c$ separate from the PEM 126. However, current sensors $CS_a$, $CS_b$, and $CS_c$ may be integrated as part of the PEM 126 depending on its configuration. Current sensors $CS_a$, $CS_b$, and $CS_c$ of FIG. 3 are installed in series with each of phase legs A, B and C (i.e., phase legs 316, 318, 320 in FIG. 3) and provide the respective feedback signals $i_{as}$, $i_{bs}$, and $i_{cs}$ (also illustrated in FIG. 3) for the system 300. The feedback signals $i_{as}$, $i_{bs}$, and $i_{cs}$ may be raw current signals processed by logic device (LD) 310 or may be embedded or encoded with data or information about the current flow through the respective phase legs 316, 318, 320. Also, the power switches 302 (e.g., IGBTs) may include current sensing capability. The current sensing capability may include being configured with a current mirror output, which may provide data/signals representative of $i_{as}$, $i_{bs}$, and $i_{cs}$. The data/signals may indicate a direction of current flow, a magnitude of current flow, or both the direction and magnitude of current flow through the respective phase legs A, B, and C.

Referring again to FIG. 3, the system 300 includes a logic device (LD) or controller 310. The controller or LD 310 can be implemented by various types or combinations of electronic devices and/or microprocessor-based computers or controllers. To implement a method of controlling the PEM 126, the controller 310 may execute a computer program or algorithm embedded or encoded with the method and stored in volatile and/or persistent memory 312. Alternatively, logic may be encoded in discrete logic, a microprocessor, a microcontroller, or a logic or gate array stored on one or more integrated circuit chips. As shown in the embodiment of FIG. 3, the controller 310 receives and processes the feedback signals $i_{as}$, $i_{bs}$, and $i_{cs}$ to control the phase currents $i_a$, $i_b$, and $i_c$, such that the phase currents $i_a$, $i_b$, and $i_c$ flow through the phase legs 316, 318, 320 and into the respective windings of the electric machine 114 according to various current or voltage patterns. For example, current patterns can include patterns of phase currents $i_a$, $i_b$, and $i_c$ flowing into and away from the DC-bus 304 or a DC-bus capacitor 308. The DC-bus capacitor 308 of FIG. 3 is shown separate from the PEM 126. However, the DC-bus capacitor 308 may be integrated as part of the PEM 126.

As shown in FIG. 3, a storage medium 312 (hereinafter "memory"), such as computer-readable memory may store the computer program or algorithm embedded or encoded with the method. In addition, the memory 312 may store data or information about the various operating conditions or components in the PEM 126. For example, the memory 312 may store data or information about current flow through the respective phase legs 316, 318, 320. The memory 312 can be part of the controller 310 as shown in FIG. 3. However, the memory 312 may be positioned in any suitable location accessible by the controller 310.

As illustrated in FIG. 3, the controller 310 transmits at least one control signal 236 to the power converter system 126. The power converter system 126 receives the control signal 322 to control the switching configuration of the inverter and therefore the current flow through the respective phase legs 316, 318, and 320. The switching configuration is a set of switching states of the power switches 302 in the inverter. In general, the switching configuration of the inverter determines how the inverter converts power between the DC power link 306 and the electric machine 114.

To control the switching configuration of the inverter, the inverter changes the switching state of each power switch 302 in the inverter to either an ON state or an OFF state based on the control signal 322. In the illustrated embodiment, to switch the power switch 302 to either ON or OFF states, the controller/LD 310 provides the gate voltage (Vg) to each power switch 302 and therefore drives the switching state of each power switch 302. Gate voltages $Vg_{a1}$, $Vg_{a2}$, $Vg_{b1}$, $Vg_{b2}$, $Vg_{c1}$, and $Vg_{c2}$ (shown in FIG. 3) control the switching state and characteristics of the respective power switches 302. While the inverter is shown as a voltage-driven device in FIG. 3, the inverter may be a current-driven device or controlled by other strategies that switch the power switch 302 between ON and OFF states. The controller 310 may change the gate drive for each IGBT based on the rotational speed of the electric machine 114, the mirror current, or a temperature of the IGBT switch. The change in gate drive may be selected from a plurality of gate drive currents in which the change gate drive current is proportional to a change in IGBT switching speed.

As also shown in FIG. 3, each phase leg 316, 318, and 320 includes two switches 302. However, only one switch in each of the legs 316, 318, 320 can be in the ON state without shorting the DC power link 306. Thus, in each phase leg, the switching state of the lower switch is typically opposite the switching state of the corresponding upper switch. The top switches are typically referred to as high-side switches (i.e., 302A, 302B, 302C) and the lower switches are typically referred to as low-side switches (i.e., 302D, 302E, 302F). Consequently, a HIGH state of a phase leg refers to the upper switch in the leg in the ON state with the lower switch in the OFF state. Likewise, a LOW state of the phase leg refers to the upper switch in the leg in the OFF state with the lower switch in the ON state. As a result, IGBTs with current mirror capability may be on all IGBTs, a subset of IGBTs (e.g., $S_{a1}$, $S_{b1}$, $S_{c1}$) or a single IGBT.

Two situations can occur during an active state of the three-phase converter example illustrated in FIG. 2: (1) two phase legs are in the HIGH state while the third phase leg is in the LOW state, or (2) one phase leg is in the HIGH state while the other two phase legs are in the LOW state. Thus, one phase leg in the three-phase converter, which may be defined as the "reference" phase for a specific active state of the inverter, is in a state opposite to the other two phase legs, or "non-reference" phases, that have the same state. Consequently, the non-reference phases are either both in the HIGH state or both in the LOW state during an active state of the inverter.

Solid state devices (SSD), such as Insulated Gate Bipolar junction Transistors (IGBTs), Metal Oxide Semiconductor Field Effect Transistors (MOSFETs), or Bipolar Junction Transistors (BJTs) are widely used in a variety of automotive and industrial applications, such as electric motor drives, power inverters, DC-DC converters, and power modules. Operation of an IGBT and a MOSFET is voltage controlled, in which the operation is based on a voltage applied to a gate of the IGBT or MOSFET, while operation of a BJT is current controlled, in which the operation is based on a current applied to a base of the BJT. Here, the use of SSDs or high-power relays may be used to control, alter, or modulate a current between a battery and an electric machine of a vehicle.

Figure 4:
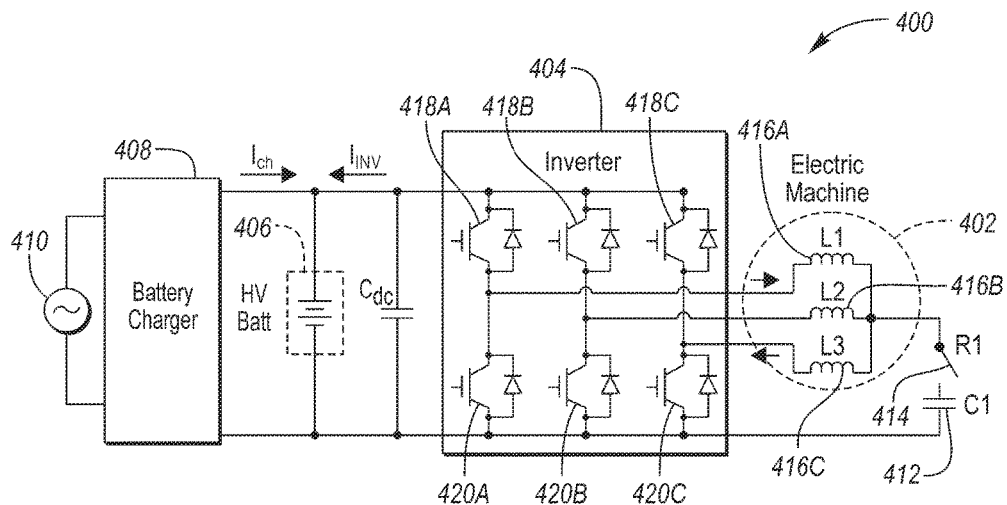
FIG. 4 is a diagram of a hybrid vehicle powertrain including an AC grid charger, a traction battery and an inverter/motor having a balancing capacitor.

FIG. 4 is a diagram of a hybrid vehicle powertrain 400 including electric machine 402 that may be configured to provide torque to drive a wheel of the vehicle or generate a current by utilizing rotational force of the wheel to rotate the electric machine 402. The electric machine is coupled with an electric machine inverter 404 that converts an AC current to a direct current (DC) current. During operation of the vehicle, a high voltage traction battery 406 is used to provide a propulsive force to rotate the electric machine and store energy captured by the electric machine from rotational energy of the wheel. When the vehicle is not in motion it may be desirable to increase the battery 406 state of charge (SOC) by coupling the battery 406 with an AC power grid 410 via a battery charger 408. One artifact of the use of the AC grid is that harmonics of the grid frequency may result in peak voltages propagated to the battery and components of the powertrain. Here, a capacitor 412 is selectively coupled with the neutral terminal of the electric machine 402 via switch 414 and the switches (418A, 418B, 418C, 420A, 420B, and 420C) of the inverter 404 are modulated to pass reactive power through the inductive windings 416A, 416B, and 416C of the electric machine 402. This allows a current flowing through the windings of the electric machine 416A, 416B, and 416C to flow to be absorbed by the capacitor 412 when engaged by the switch 414. The current is controlled via pull-up switches 418A, 418B, and 418C and pull-down switches 420A, 420B, and 420C, these switches are also referred to as high-side switches 418A, 418B, and 418C and low-side switches 420A, 420B, and 420C.

The battery charger may be an AC Level 1, Level 2 or Level 3 charger as defined by the Society of Automotive engineers (SAE) such as described in SAE J1772 and other SAE specifications. Here, the switch R1 414, which may be a relay, IGBT, MOSFET, or other solid state switch, selectively couples the capacitor C1 412 between the neutral terminal of the elected machine 402 and the negative bus of the inverter 404. While the vehicle is coupled with the AC grid and not in motion, the electric machine stator windings (i.e., inductors L1, L2, and L3). The inverter modulated the switches (416 and 418) at a frequency fsw that is greater than the line frequency of the ac grid 410. The frequency fsw may be greater than 20 times (e.g., 1 KHz, 1.2 KHz, 2 KHz, 2.4 KHz, 5 KHz, or 6 KHz) the line frequency (e.g., 50 Hz or 60 Hz).

The smoothing capacitor C1 412 is used as energy storage device to absorb ripple power. The inductor Lm represents the winding inductance of the electric machine 402. The inductance Lm is used to transfer the reactive energy to the capacitor 412 and not typically used as an energy storage device. Depending upon the value of the inductance of the windings (416A, 416B, and 416C), the switching frequency and a low frequency ripple magnitude, the inductor may operate in a discontinuous mode or continuous mode.

The switches in the three phase legs are divided into two groups: the upper three switches (418A, 418B, and 418C) and the lower three switches (420A, 420B, and 420C). Within each group, the switches can operate in different modes. For example, in a first "parallel" mode, the three switches (e.g., the upper switches or the lower switches) act simultaneously such that all upper switches are activated equally and all lower switches are activated equally. Another mode is an "interleaving" mode in which the three switches (e.g., the upper switches or the lower switches) operate in ⅓ of switching cycle apart. A third "selective" mode is such that only one or two switches operates at a given time. Although this has been illustrated using 3-phase electric machines, this invention is not limited to a 3-phase electric machine as it may also be implemented in a 6-phase, 9-phase, or other poly-phase electric machine in which the balancing capacitor is coupled between a neutral terminal of the poly-phase electric machine and a negative terminal of the inverter for the electric machine. The operation of the switches is such that no steady state rotational torque is applied to the electric machine as any transient torques produced by the fields induced will generally be equal and opposite in some embodiments or will be balanced such that the rotational torque is substantially zero. For example, flowing the same (balanced) current through all phases of an electric machine will generate a balanced uniform field in the electric machine such that minimal or no rotational torque results. Further, the switches may be modulated to compensate for the rotor position and differences in characteristics of the electrical components of the inverter (e.g., switches, diodes, and connections) and phases of the electric machine (e.g., 416A, 416A, and 416A).

Figure 5:
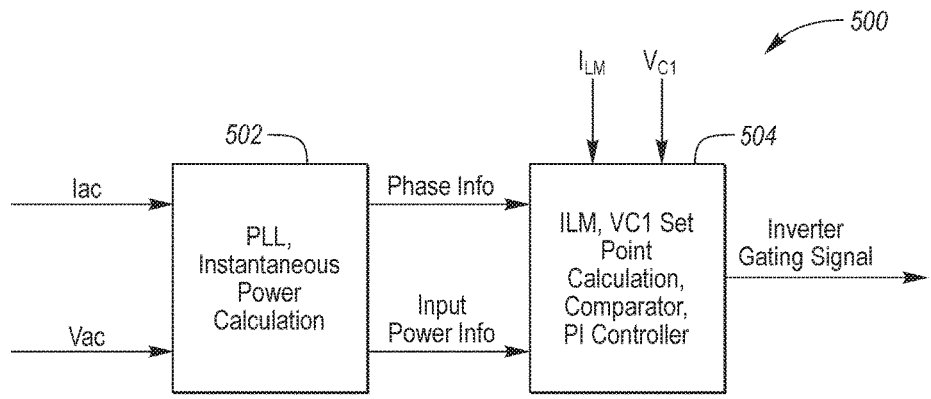
FIG. 5 is a block diagram of inverter signal flow for a hybrid vehicle during AC charging.

FIG. 5 is a block diagram of inverter signal flow 500 for a hybrid vehicle during AC charging. The control of the inverter is performed to direct the reactive power of the charging operation from the AC grid to the capacitor. Here, sensing items on the grid side may include voltage/current (e.g., Iac and Vac) which may be calculated by a first control block 502 (e.g., an AC charger controller) to produce phase information and input power data. The phase information and input power data may be communicated to a second control block 504 that may be located within the vehicle and used along with sensing information which may include current of the inductor Lm (Ilm) and a voltage of the capacitor (Vc1). The output of this control flow is an inverter gating signal that is used to couple the smoothing capacitor (e.g. smoothing capacitor 412) between the neutral terminal of the electric machine and the negative terminal of the inverter. Further, this inverter gating signal may also be used to control switches of the inverter (418A, 418B, 418C, 420A, 420B, and 420C).

Figure 6:
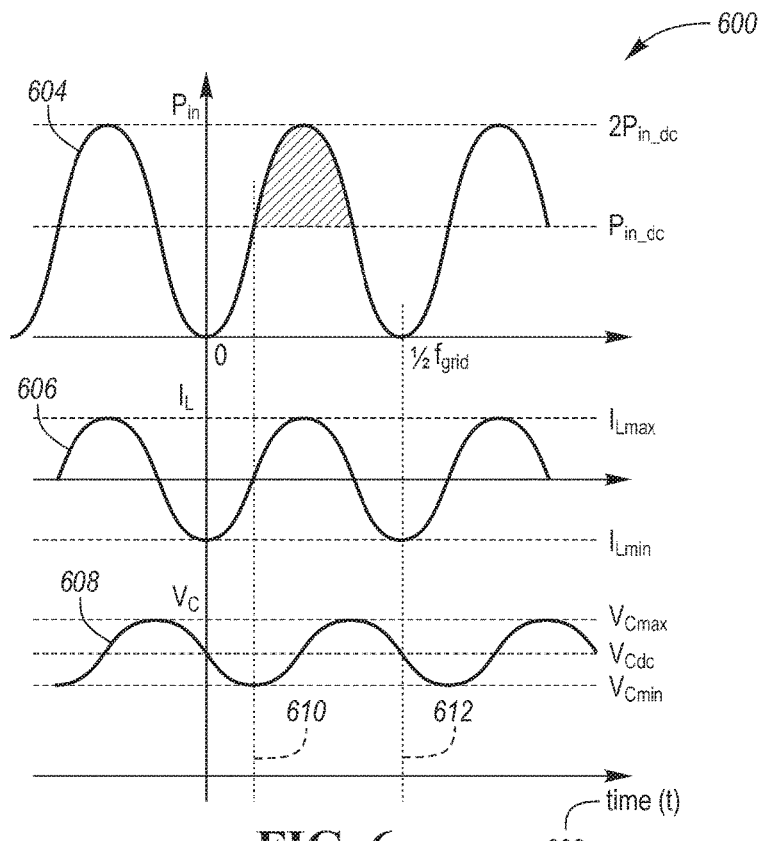
FIG. 6 is a graphical representation of AC characteristics of charging and powertrain components during AC charging of a hybrid vehicle.

FIG. 6 is a graphical representation of AC characteristics 600 of charging and powertrain components during AC charging of a hybrid vehicle with respect to time 602. An input power 604, inductor current 606 and bulk DC capacitor voltage 608 are graphically shown with respect to time 602. At time 610, the current is zero when the input DC power is equal to the grid power, and at time 612 at ½ the grid frequency, the input power is zero when the current is at a minimum. These waveforms of the input power, inductor current and capacitor voltage (only DC and twice the grid frequency components are shown). During this measurement, the battery charger is operated such that an input voltage and current to the battery charger achieves unity power factor, but in most cases, a typical commercial charger may not achieve a unity power factor. However, in non-unity power factor cases and systems having other frequency components, these control methods and circuits may be applied.

For calculation purposes, assume that all AC side low frequency ripples are passed to the battery side through the charger. The input power may then be based on:

$$P_{in} = P_{in\_dc} \times (1 + \cos(2f_{grid} \times 2\pi t)) \quad (1)$$

The reactive energy to be absorbed by the capacitor $C_1$ may be calculated based on:

$$\Delta E_{Cap} = \int_0^{1/4 f_{grid}} P_{in\_dc} \times \cos(2\pi \times 2f_{grid}t)dt = \frac{P_{in\_dc}}{2\pi f_{grid}} J \quad (2)$$

The voltage swing of the capacitor may be calculated based on:

$$\Delta V_c = \frac{P_{in\_dc}}{4\pi f_{grid} \times C_1 \times V_{C\_dc}} \quad (3)$$

$$C_1 = \frac{P_{in\_dc}}{4\pi f_{grid} \times \Delta V_c \times V_{C\_dc}} \quad (4)$$

Equation (4) provides a guideline for the capacitor selection. For example, consider a 3.3 KW charger with a 60 Hz grid frequency, a 400V capacitor dc voltage and 50 V capacitor voltage ripple, (3,300/(4*π*60*50*400)) thus a 200 uF capacitor may be used to satisfy the requirement of equation 4.

Figure 7:
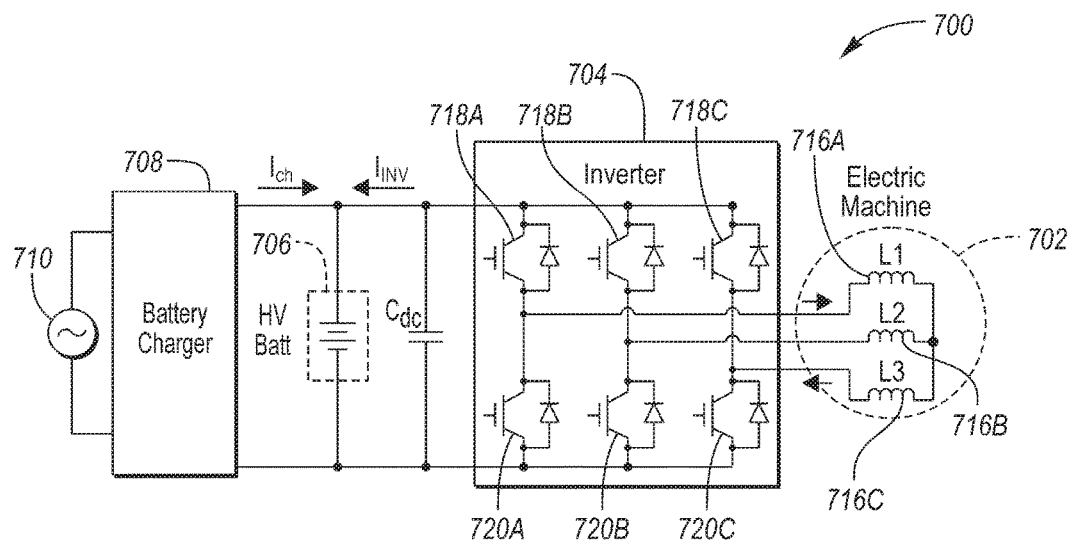
FIG. 7 is a diagram of a hybrid vehicle powertrain including an AC grid charger, a traction battery and an inverter/motor configured to balance power during charging.

FIG. 7 is a diagram of a hybrid vehicle powertrain 700 including electric machine 702 that may be configured to provide torque to drive a wheel of the vehicle or generate a current by utilizing rotational force of the wheel to rotate the electric machine 702. The electric machine is coupled with an electric machine inverter 704 that converts an AC current to a direct current (DC) current. During operation of the vehicle, a high voltage traction battery 706 is used to provide a propulsive force to rotate the electric machine and store energy captured by the electric machine from rotational energy of the wheel. When the vehicle is not in motion it may be desirable to increase the battery 706 state of charge (SOC) by coupling the battery 706 with an AC power grid 710 via a battery charger 708. One artifact of the use of the AC grid is that harmonics of the grid frequency may result in peak voltages propagated to the powertrain. Here, a current may be directed through at least one of the phases of the electric machine 702 via the inverter 704. A current may be directed to flow through at least one winding of the electric machine (e.g., 716A, 716B, and 716C) and then return via a different winding of the electric machine. The current is controlled via pull-up switches 718A, 718B, and 718C and pull-down switches 720A, 720B, and 720C. For example, a current may be directed to flow through a first phase 716A via turning-on a first switch 718A and the current may then return via a second phase 716B via turning-on a second switch 720B. In an alternative embodiment, the current may return via a second phase 716B and a third phase 716C via turning-on a second switch 720B and a third switch 720C.

An equivalent circuit for FIG. 7 is basically an H-bridge with an inductor across the bridge. The inductor Lm represents the equivalent winding inductance of the phases in either series or parallel dependent upon the switch configuration, which may have different values depending on different circuit configurations. The pull-up switches 718A, 718B, and 718C and pull-down switches 720A, 720B, and 720C form a full bridge inverter and are controlled to generate the inductor current $I_{Lm}$. The pull-up switches 718A, 718B, and 718C and pull-down switches 720A, 720B, and 720C may be operated at a frequency fsw that may be much higher (>20 times) than the line frequency of the AC grid. And the pull-up switches 718A, 718B, and 718C and pull-down switches 720A, 720B, and 720C may be controlled such that the inductor current $I_L$m tracks the input power to compensate for the reactive power components thereof. Although this has been illustrated using 3-phase electric machines, this embodiment is not limited to a 3-phase electric machine as it may also be implemented in a 6-phase, 9-phase, or other poly-phase electric machine in which a current flows out at least one phase and returns via at least one different phase. The operation of the switches is such that no steady state rotational torque is applied to the electric machine as transient torques produced by the fields induced will generally be equal and opposite in some embodiments or will be balanced such that the rotational torque is substantially zero. For example, flowing the same (balanced) current through one phase of an electric machine and returning the current via a separate different phase to generate a balanced uniform field in the electric machine such that minimal or no rotational torque results. Another example is flowing a current through one phase of an electric machine and returning the current via the two remaining phases to generate a balanced uniform field in the electric machine such that minimal or no rotational torque results. Further, the switches may be modulated to compensate for the rotor position and differences in characteristics of the electrical components of the inverter (e.g., switches, diodes, and connections) and phases of the electric machine (e.g., 716A, 716A, and 716A).

In the following analysis, it is also assumed that the input voltage and current have unity power factor, which is the case for most commercial chargers. However, for non-unity power factor case, and for other frequency component, the analysis will be similar. Here, two cases are investigated, first when $I_{Lm}$ has a large DC value plus AC ripples, and second when $I_{Lm}$ has no or small DC value plus AC ripples.

In the case in which $I_{Lm}$ has a large DC value plus AC ripples, the inductor current is always positive and the AC component of the inductor current $I_{Lm}$ tracks the input reactive power to compensate for the grid side ripple. Here, the current ripple on the inductor may be calculated based on:

$$\Delta I_L = \frac{P_{in\_dc}}{4\pi f_{grid} \times L_m \times I_{L\_dc}} \quad (5)$$

In which the required inductance of the motor stator windings may be based on:

$$L_m = \frac{P_{in\_dc}}{4\pi f_{grid} \times \Delta I_L \times I_{L\_dc}} \quad (6)$$

Equation 6 provides a guideline for a recommended inductance. For example, for a 3.3 KW charger with 60 Hz grid frequency, 50 A current ripple and 400 A inductor DC current, a 200 uH equivalent inductance of the stator windings may be used to satisfy the requirement.

The control of the inverter is to direct the low frequency reactive power to the inductor. The sensing items on the grid side may include voltage/current (e.g., Iac and Vac) that may be used to produce phase information and input power data. The phase information and input power data may be used along with vehicle sensing information which may include current of the inductor Lm (Ilm).

The second case when $I_{Lm}$ has no or small dc value plus ac ripples, the inductor current may go negative. And the AC component of the inductor current tracks the input reactive power to compensate for the grid side ripple. Unity power factor input power may be based on the following equations:

$$P_{in\_ac} = P_{in\_dc}\cos(2f_{grid} \times 2\pi t)) \quad (7)$$

$$E_{in\_ac} = \frac{P_{in\_dc}}{4\pi f_{grid}}(1 + \sin(2f_{grid} \times 2\pi t)) \quad (8)$$

$$I_{Lm} = \pm\sqrt{\frac{P_{in\_dc}}{4\pi f_{grid} L_m}(1 + \sin(2f_{grid} \times 2\pi t))} \quad (9)$$

Figure 8:
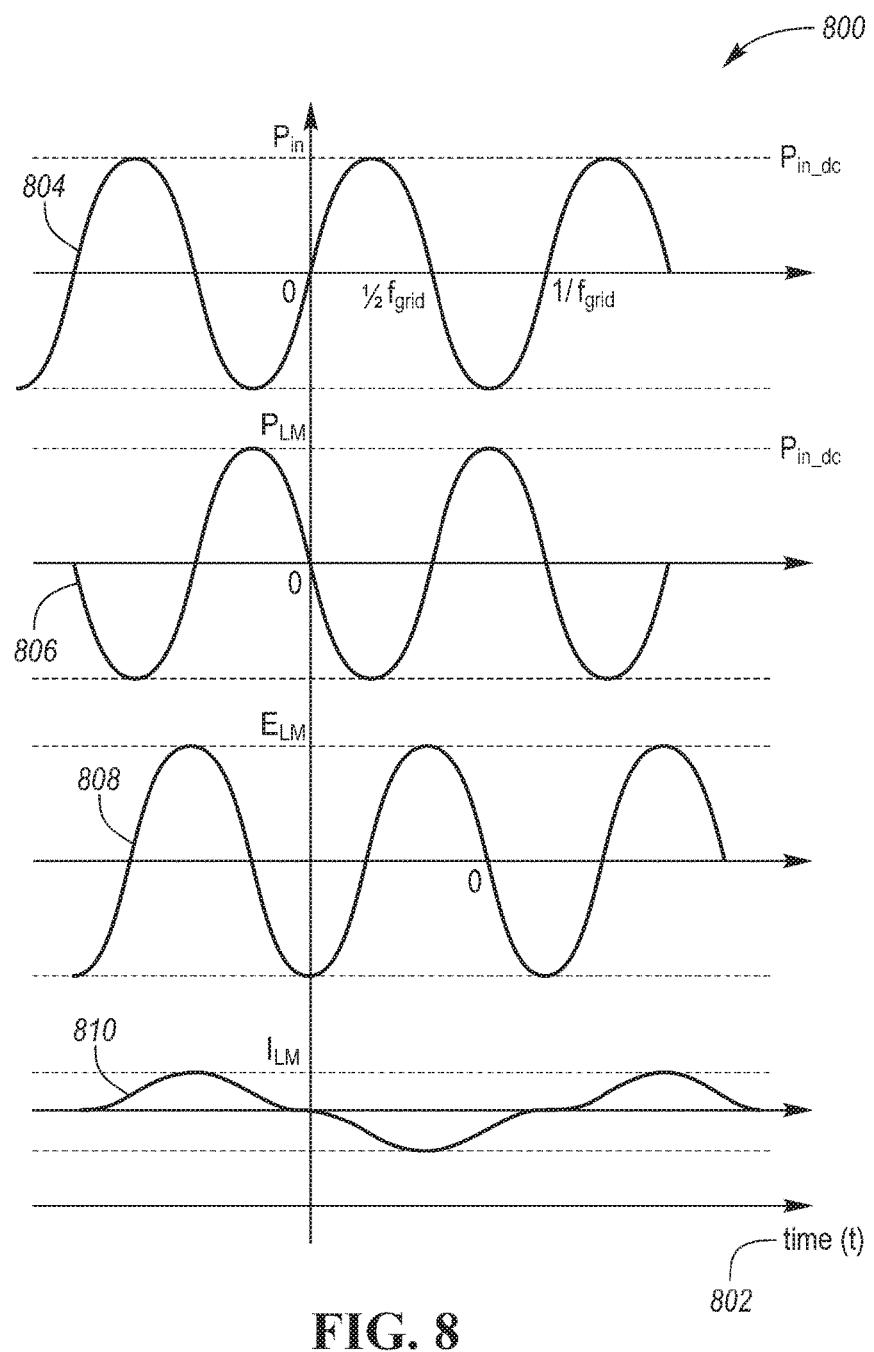
FIG. 8 is a graphical representation of AC characteristics of charging and powertrain components during AC charging of a hybrid vehicle.

Equation 9 provides the inductor current value used to compensate for the power at twice the grid frequency ripple at unity power factor conditions. The polarity of the inductor current may be selected as desired to minimize the conduction loss of the circuit (e.g., through the switches and components of the powertrain). FIG. 8 shows waveforms associated with characteristics of the circuit including an inductor current that is illustrative of one embodiment, in which the polarity switches each time the inductor current goes to zero.

FIG. 8 is a graphical representation of AC characteristics 800 of charging and powertrain components during AC charging of a hybrid vehicle with respect to time 802. An input power 804, inductor power 806, inductor energy 808, and inductor current 810 are graphically shown with respect to time 802. During this measurement, the battery charger was operated such that an input voltage and current to the battery charger achieved unity power factor, however in most cases, a typical commercial charger may not achieve a unity power factor. However, for non-unity power factor cases and systems with other frequency components, the control methods and circuits may be applied.

Here, the peak inductor current is based on:

$$I_{Lm\_peak} = \sqrt{\frac{P_{in\_dc}}{2\pi f_{grid} L_m}} \qquad (9)$$

For example, for a 3.3 KW charger with 60 Hz grid frequency and a 200 uH equivalent inductance of the stator windings, the peak inductor current is around 200 A.

To fully utilize the three phases of the electric machine and balance their thermal performance, the following modulation phase utilization scheme could be used. For the three intervals shown in FIG. 8, each phase may be operated in two of them, which has one 'out' and one 'in' current. One example of a modulation scheme is tabulated in Table 1.

TABLE 1

The direction of current flow of each phase at different intervals

| Phase | 1 | 2 | 3 |
|---|---|---|---|
| A | Out | 0 | In |
| B | In | Out | 0 |
| C | 0 | In | Out |

It should be noted that it is also possible for a two phase modulation scheme, which is shown in Table 2.

TABLE 2

The direction of current flow of each phase at different intervals

| Phase | 1 | 2 | 3 |
|---|---|---|---|
| A | Out | Out | In |
| B | In | Out | Out |
| C | Out | In | Out |

Figure 9:
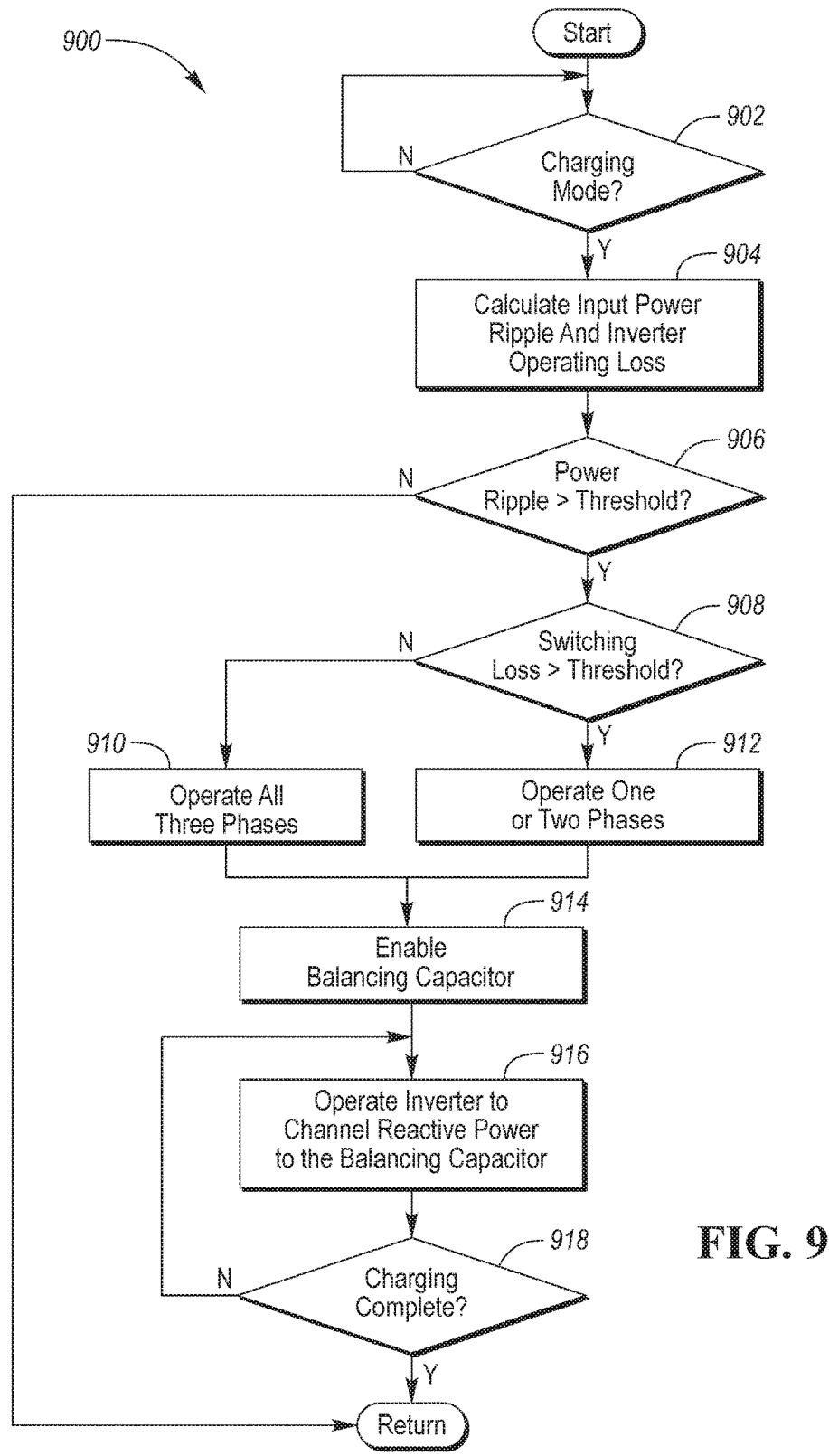
FIG. 9 is a flow diagram of a control system for an inverter to channel reactive power to a balancing capacitor.

FIG. 9 is a flow diagram 900 of a control system for an inverter to channel reactive power to a balancing capacitor. In operation 902 a controller branches based on an operational mode of a hybrid vehicle. If the vehicle is not in a charging mode, the controller will branch back to operation 902. If the operational mode is a charging mode, the controller branches to operation 904.

In operation 904, the controller calculates the input power ripple (e.g., Pin as shown in FIG. 6 and FIG. 8) and an operating loss of the inverter and proceeds to operation 906. In operation 906, the controller branches based on the input power ripple exceeding a threshold. The threshold may be based on a predetermined value, for example the predetermined value may include the maximum allowable ripple value to the battery or the predetermined value may be determined by the charging efficiency requirement and the inverter circuit loss. If the input power ripple is less than the threshold, the controller will exit, and if the input power ripple is greater than the threshold, then the controller will branch to operation 908.

In operation 908, the controller branches based on the inverter switching loss exceeding a threshold. The threshold may be based on a predetermined value, for example the predetermined value may include the maximum allowable ripple value to the battery or the predetermined value may be determined by the charging efficiency requirement and the inverter circuit loss. If the inverter switching loss is less than the threshold, the controller will proceed to operation 910 in which the controller will operate all phases of the electric machine and proceed to operation 914. If the inverter switching loss is greater than the threshold, the controller will proceed to operation 912 in which the controller will operate a limited number phases of the electric machine and proceed to operation 914. The limited number may be a single phase of a three phase electric machine, or 2 phases of a three phase electric machine. For example, a system as shown in FIG. 4 may engage all three phases (416A, 416B, and 416C) if the switching loss is below the threshold thereby minimizing the inductance to the balancing capacitor. And if the loss is greater than the threshold, the system as shown in FIG. 4 may engage a limited number of phases such as a single phase (i.e., 416A, 416B, or 416C) or a combination of two phases (i.e., 416A+416B, 416A+416C, or 416B+416C) thereby minimizing power that needs to be dissipated in the inverter or in the inductance(s) prior flowing to the balancing capacitor. This flow diagram may also be used in a system without a balancing capacitor (e.g., FIG. 7). In that embodiment for example, the system as shown in FIG. 7 may engage all three phases (e.g. flowing a current out a single phase and returning the current via the remaining two phases). This can be visualized as flowing out 416A and returning on 416B+416C, or flowing out 416B and returning on 416A+416C, or flowing out 416C and returning on 416A+416B. Likewise, if the loss is greater than the threshold, the system as shown in FIG. 7 may engage a limited number of phases such as a single phase for both source and return (i.e., out on 416A and return on 416B, or out on 416A and return on 416C, or out on 416B and return on 416C) thereby minimizing power that needs to be dissipated in the inverter or in the inductance(s). If the system has a balancing capacitor, the controller proceeds to operation 914 flows, however in embodiments of the system that do not have a balancing capacitor, the system will proceed to operation 916.

In operation 914 the controller couples a balancing capacitor between a neutral terminal of the wye wound electric machine and a negative terminal of the inverter for the electric machine. Although this has been illustrated using 3-phase electric machines, this invention is not limited to a 3-phase electric machine as it may also be implemented in a 6-phase, 9-phase, or other poly-phase electric machine in which the balancing capacitor is coupled between a neutral terminal of the poly-phase electric machine and a negative terminal of the inverter for the electric machine. After the balancing capacitor is coupled, the controller proceeds to operation 916.

In operation 916, the controller operates the inverter to channel reactive power from the charging operation to the balancing capacitor via the switches of the inverter. In an embodiment without the balancing capacitor, the controller operates the inverter to channel reactive power through phases of the electric machine via the switches of the inverter. After the controller proceeds to operation 918. In operation 918, the controller branches in response to a status of the charging, if the charging is not complete, the controller will branch to operation 916 and continue to operate the inverter. If the charging is complete, the controller will exit.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A powertrain comprising:
   a battery;
   a wye wound electric machine coupled with an inverter; and
   a controller configured to, responsive to an electrical connection between the battery and an AC grid that results in charging of the battery with energy from the AC grid, close a switch to connect a capacitor between a neutral terminal of the electric machine and a negative terminal of the inverter to absorb reactive power associated with the energy.

2. The powertrain of claim 1, wherein the capacitor is connect between negative and positive terminals of the electric machine when the electric machine is operated in a propulsion or generation mode.

3. The powertrain of claim 1, wherein the controller is further configured to modulate switches of the inverter to balance reactive power through windings of the electric machine and the capacitor.

4. The powertrain of claim 3, wherein the switches of the inverter include high-side switches and low-side switches, and the controller is further configured to modulate all high-side switches equally and module all low-side switches equally.

5. The powertrain of claim 1, wherein the wye wound electric machine is a wye wound 3-phase electric machine.

6. A method of controlling a powertrain comprising:
   responsive to an electrical connection between an AC grid and an electric vehicle containing the powertrain that results in charging of a battery of the powertrain with energy from the AC grid, modulating switches of an inverter according to reactive power associated with the energy to induce a field in a wye wound electric machine of the powertrain to absorb a portion of the reactive power.

7. The method of claim 6 further including, responsive to the electrical connection, closing a switch to connect a capacitor between a neutral terminal of the electric machine and a negative terminal of the inverter.

8. The method of claim 7 further including, responsive to termination of the electrical connection, opening the switch to disconnect the capacitor from between the neutral terminal and the negative terminal.

9. The method of claim 6, wherein the switches of the inverter include high-side switches and low-side switches, and all high-side switches are modulated together and all low-side switches are modulated together.

10. A powertrain comprising:
a battery;
a wye wound electric machine coupled with an inverter; and
a controller configured to, responsive to an electrical connection between the battery and an AC grid that results in charging of the battery with energy from the AC grid, modulate switches of the inverter to flow a current in the electric machine to absorb reactive power associated with the energy in at least one winding of the electric machine.

11. The powertrain of claim 10, wherein the current in the electric machine induces a transient torque of the electric machine that is negated over a time period defined by a predetermined number of cycles the switches are modulated such that a steady state torque is zero.

12. The powertrain of claim 10, wherein the at least one winding is at least two windings.

13. The powertrain of claim 10, wherein the controller is further configured to, responsive to the electrical connection, close a switch to connect a capacitor between a neutral terminal of the electric machine and a negative terminal of the inverter.

14. The powertrain of claim 13, wherein the capacitor is connected between a positive terminal of the electric machine and the negative terminal of the electric machine when the electric machine is operated in a propulsion or generation mode.

15. The powertrain of claim 14, wherein the controller is further configured to modulate switches of the inverter to balance reactive power through windings of the electric machine and the capacitor.

16. The powertrain of claim 15, wherein the switches include high-side switches and low-side switches, and the controller is further configured to modulate all high-side switches equally and module all low-side switches equally.

17. The powertrain of claim 10, wherein the wye wound electric machine is a wye wound 3-phase electric machine.

* * * * *